(12) United States Patent
Burch et al.

(10) Patent No.: US 7,258,081 B2
(45) Date of Patent: Aug. 21, 2007

(54) COMPACT WATER VAPORIZER FOR DYNAMIC STEAM GENERATION AND UNIFORM TEMPERATURE CONTROL

(75) Inventors: Steven D Burch, Honeoye Falls, NY (US); Thomas P Migliore, Rochester, NY (US); Frederick V Oddi, Orchard Park, NY (US)

(73) Assignee: General Motors Corporation, Detroit, MI (US)

( * ) Notice: Subject to any disclaimer, the term of this patent is extended or adjusted under 35 U.S.C. 154(b) by 714 days.

(21) Appl. No.: 10/703,216

(22) Filed: Nov. 6, 2003

(65) Prior Publication Data

US 2005/0100490 A1 May 12, 2005

(51) Int. Cl.
*F22B 1/02* (2006.01)

(52) U.S. Cl. ............... 122/31.1; 122/367.1; 429/19

(58) Field of Classification Search ............ 122/31.1, 122/32, 367.1; 165/140, 163; 429/17, 19
See application file for complete search history.

(56) References Cited

U.S. PATENT DOCUMENTS

| | | | | |
|---|---|---|---|---|
| 4,407,235 A | * | 10/1983 | Deng ..................... | 122/161 |
| 5,249,624 A | * | 10/1993 | Pow et al. ............... | 165/110 |
| 6,759,016 B2 | * | 7/2004 | Sederquist et al. ...... | 422/196 |
| 6,948,559 B2 | * | 9/2005 | Reinke et al. ........... | 165/140 |
| 6,953,009 B2 | * | 10/2005 | Reinke et al. ........... | 122/31.1 |
| 2003/0129108 A1 | | 7/2003 | Burch et al. | |

* cited by examiner

*Primary Examiner*—Gregory Wilson
(74) *Attorney, Agent, or Firm*—Harness, Dickey & Pierce, P.L.C.

(57) ABSTRACT

A compact cylindrical vaporizer for simultaneous reduction of a reformate stream temperature and generation of a process stream is disclosed. The vaporizer utilizes counter flowing nested tubular portions that spiral between an outer section of the vaporizer and a central section of the vaporizer. The return spiral has a larger cross-sectional area than the inward spiral to accommodate a higher volumetric flow rate of the water flowing there through as it vaporizes while keeping the fluid velocity below erosion design constraints. The counter spiraling flow provides a substantially uniform spatial temperature profile of a reformate stream flowing on the exterior of the tubular portions. The vaporizer can be sized to be substantially the same as that of an upstream reactor to minimize velocity losses and pressure drops in the reformate stream flowing there through. A plurality of fins are positioned between the opposing tubular portion to enhance the heat transfer.

31 Claims, 5 Drawing Sheets

COMPACT WATER VAPORIZER FOR DYNAMIC STEAM GENERATION AND UNIFORM TEMPERATURE CONTROL

FIELD OF THE INVENTION

The present invention relates to water vaporizers and, more particularly, to water vaporizers in a fuel reforming process that produces a hydrogen fuel for fuel cells.

BACKGROUND OF THE INVENTION

Fuel cells are a leading alternate fuel power plant candidates for both portable and stationary electrical power generation. A fuel cell is an electrical chemical energy converter consisting of two electrodes which sandwich an electrolyte. In one form, an ion-conducting polymer electrolyte membrane (PEM) is disposed between two electrode layers to form a membrane electrode assembly (MEA). The MEA is typically porous and electrically conductive to promote the desired electrochemical reaction from two reactants. One reactant, oxygen or air, passes over one electrode and hydrogen, the other reactant, passes over the other electrode to produce electricity, water and heat. Typical PEM fuel cells with membrane electrode assembly (MEA) are described in U.S. Pat. Nos. 5,272,017 and 5,316,871, issued respectively Dec. 21, 1993 and May 31, 1994 and assigned to the General Motors Corporation.

The hydrogen that is consumed by the fuel cell can be produced by a fuel processor that converts a hydrocarbon fuel, such as gasoline, methanol, or natural gas, into a hydrogen-containing reformate stream that can be used to make electricity in the fuel cell stack. The typical fuel processor uses three steps to produce such a conversion. In a first step, the primary reactor (usually an auto thermal reactor (ATR) or steam reformer (SR)) converts the hydrocarbon fuel to the hydrogen-containing reformate. However, during the first step significant levels of carbon monoxide (CO) may be present (6%-10%). Thus, in a second step, also known as a CO-reduction step, a water gas shift reactor (WGS) is typically used to reduce the CO content to about 0.3% to 1% and increase the hydrogen content of the hydrogen-containing reformate stream. In a third or final step, also known as a CO-polishing step, the CO content is further reduced to about 2 to 50 ppm depending on the fuel cell stack used. This final step is accomplished typically with either a preferential oxidation (PrOx) reactor or a pressure-swing absorption (PSA) device.

The hydrogen-containing reformate stream produced in the primary reactor exits the primary reactor at an elevated temperature. The reformate stream is typically cooled with either a fuel cell stack coolant or ambient air to reduce the temperature prior to entering the CO-reduction or CO-polishing stages. The heat extracted from the reformate stream is lost thermal energy. In some fuel processor systems, to maximize the fuel processor efficiency the heat extracted from cooling the reformate stream is integrated back into the system as heat required to generate and superheat steam used in the primary reactor and elsewhere in the system.

Previous attempts to recover heat from the cooled reformate have relied upon the use of an intermediate heat transfer fluid, such as oil or the like. The use of an intermediate heat transfer fluid, however, can increase the size of the fuel processor system along with increasing the complexity. Increasing the size and/or complexity of the fuel processor system may be undesirable, particularly in a portable application wherein space may be at a premium. Thus, it is desirable to provide a means of integrating the heat from cooling the reformate stream back into a fuel processor system utilizing a compact heat exchanger. Further, it would be advantageous if such can be performed while minimizing the complexity of such a system.

Each of the stages on the fuel processor system run at different reactor temperatures. The operation of these different reactors can be improved by supplying a reformate stream that has a generally uniform temperature profile. That is, the efficiency of the fuel processor system can be improved by proving a reformate stream that has a generally uniform temperature profile so that the downstream reactors can be designed to operate in a narrower range that conforms to the temperature profile of the reformate stream. Thus, it would be advantageous to produce a reformate stream having a generally uniform temperature profile while extracting heat from the reformate stream.

Furthermore, the use of a heat exchanger to remove heat from the reformate stream can result in a pressure drop and/or a change in a velocity profile of the reformate stream. The pressure drop and velocity changes represent lost energy that, if minimized, can increase the efficiency of the fuel processor system. Thus, it would be advantageous to extract heat from the reformate stream while providing a minimal pressure drop and/or providing a generally uniform velocity profile of the reformate stream.

SUMMARY OF THE INVENTION

The present invention provides for the use of a compact cylindrical vaporizer (heat exchanger) for simultaneous reduction of reformate stream temperature and generation of process steam. The vaporizer can be positioned in a variety of locations in a fuel processor system, such as after a WGS reactor, a PrOx reactor, and/or a PSA device. Liquid process water is fed into the vaporizer and a high-quality two-phase water exits the vaporizer. A vaporizer according to the principles of the present invention is advantageous over prior art heat exchangers used in a fuel processor system by providing a compact (low volume) design that is of a low weight and a minimal complexity. Additionally, the vaporizer according to the principles of the present invention is advantageous by providing a low pressure drop and being capable of producing a generally uniform spatial temperature profile and velocity profile of the reformate stream exiting the vaporizer. In this manner, the present invention gives stability and buffering to the conditioning of the reformate steam during transient operation of the fuel processing system.

A vaporizer according to the principles of the present invention includes a first tubular portion having a first passageway operable to exchange heat between a fluid in the first passageway and a fluid on an exterior of the first tubular portion. The first tubular portion extends radially inwardly from an outer section of the vaporizer to a central section of the vaporizer. The vaporizer also includes a second tubular portion having a second passageway in fluid communication with the first passageway and operable to exchange heat between a fluid in the second passageway and a fluid on an exterior of the second tubular portion. The second tubular portion extends radially outwardly from the central section of the vaporizer to the outer section of the vaporizer substantially following a path of the first tubular portion while being spaced apart from the first tubular portion.

The present invention also discloses a fuel processing system that is operable to reform a fuel for a fuel cell. The system according to the principles of the present invention includes a reactor having a reformate exhaust and a vaporizer. The vaporizer has a first element having a first passageway operable to exchange heat between a fluid in the first passageway and a fluid on an exterior of a first element. The first element extends from an outer section of the vaporizer to a central section of the vaporizer. The vaporizer also has a second element having a second passageway in fluid communication with the first passageway. The second element is operable to exchange heat between a fluid in the second passageway and a fluid on an exterior of the second element. The second element extends from the central section of the vaporizer to the outer section of the vaporizer substantially following a path of the first element while being spaced apart therefrom.

In another aspect, a vaporizer according to the principles of the present invention is disclosed The vaporizer includes a housing defining a fluid flow path. There is a first element disposed within the fluid flow path. The first element has a first inlet, a first outlet and a first spiral passageway therebetween. There is a second element disposed within the fluid flow path. The second element has a second inlet, a second outlet and a second spiral passageway therebetween. The first outlet is in fluid communication with the second inlet and the first and second spiral passageways are arranged within the housing in a generally parallel, spaced apart relationship.

A method of operating a fuel processing system according to the principles of the present invention is also disclosed. The method includes: (1) producing a reformate stream in a first reactor; (2) reducing a carbon monoxide level in the reformat stream in a second reactor; and (3) removing heat from the reformate stream exiting the second reactor with a vaporizer. Removing heat from the reformate stream includes: (a) routing a fluid stream in a spiral manner from an outer section of the vaporizer to a central section of the vaporizer via an inwardly spiraling passageway and from the central section back to the outer section via an outwardly spiraling passageway; and (b) routing the reformate stream from the second reactor over an exterior surface of the spiraling passageways.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
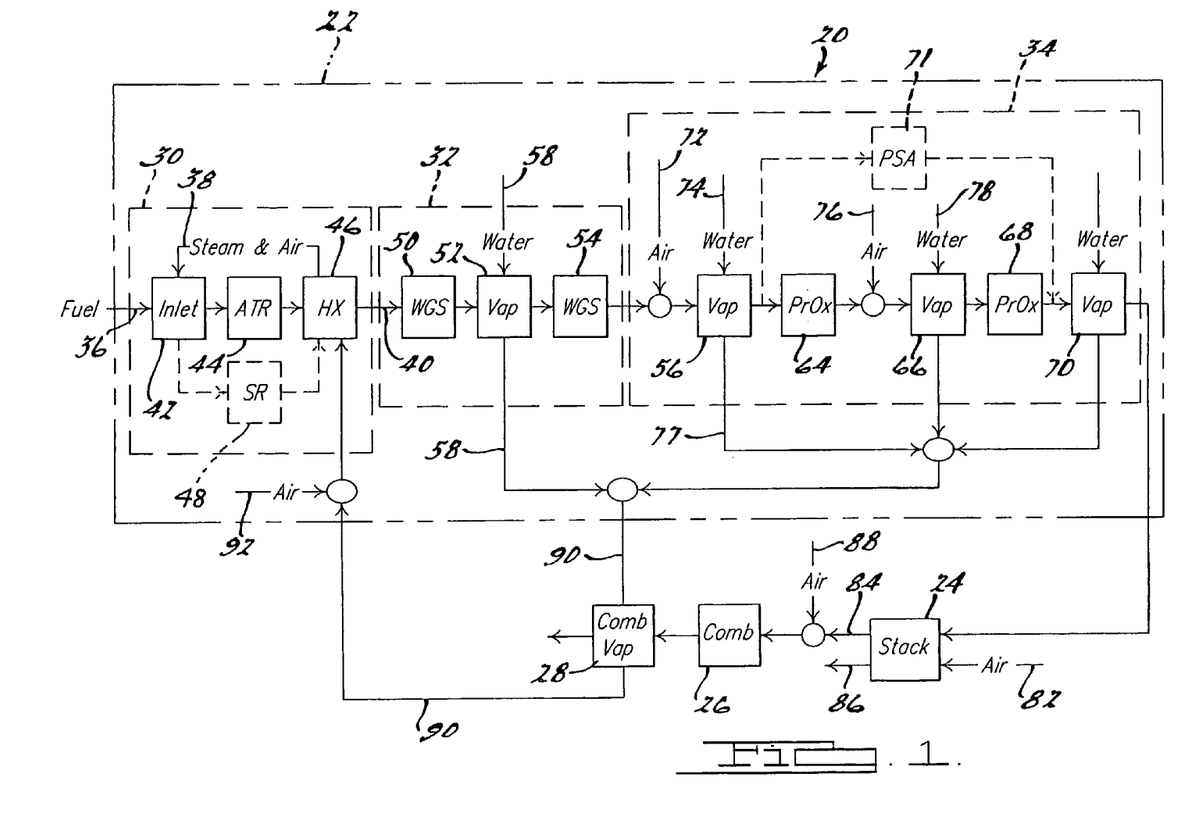
FIG. 1 is a schematic diagram of the preferred embodiment of a fuel processor system according to the principles of the present invention.

The present invention is directed to a compact cylindrical vaporizer (heat exchanger) for simultaneous reduction of reformate temperature and process steam generation in a fuel processing system. A fuel cell system 20 utilizing a vaporizer according to the principles of the present invention is shown in FIG. 1. Fuel cell system 20 includes a fuel processing system 22, a fuel cell stack 24, a combustor 26 and a combustor vaporizer 28.

Fuel processing system 22, according to the principles of the present invention includes a first stage primary reactor 30 operable to produce a reformate stream, a second stage reactor 32 operable to reduce a CO content of the reformate stream, and a third stage or CO-polishing stage reactor 34 operable to further reduce the CO content of the reformate stream.

Primary reactor 30 is operable to convert a hydrocarbon fuel stream 36 and a steam/air stream 38 into a hydrogen-containing reformate stream 40. Primary reactor 30 includes an inlet portion wherein fuel stream 36 and steam/air stream 38 are mixed together. The fluid in inlet portion 42 flows into an auto thermal reformer (ATR) 44 wherein the hydrocarbon fuel and steam/air are converted into reformate stream 40. Reformate stream 40 flows from ATR 44 into a heat exchanger 46 wherein thermal energy from reformate stream 40 is used to heat steam/air stream 38. Alternatively, primary reactor 30 can use a steam reformer 48 in lieu of or in addition to ATR 44, as shown in the dashed lines in FIG. 1. ATR 44 operates at a temperature between about 700-750° C. and produces reformate stream 40 that contains between about 6% to 10% CO.

Second stage reactor 32 receives reformate stream 40 and is operable to reduce the CO content of reformate stream 40 to about 0.3% to 1% while increasing the hydrogen content. Second stage reactor 32 includes a medium temperature water gas shift (WGS) reactor 50, a first vaporizer 52 according to the principles of the present invention, and a low temperature WGS reactor 54. Alternatively, a high temperature WGS reactor (not shown) could be used in place of medium temperature WGS 50. As used herein, a high temperature WGS reactor operates in a range of about 400-550° C., a medium temperature WGS reactor operator in a range of about 300-400° C. and a low temperature WGS reactor operates in a range of about 200-300° C. Reformate stream 40 passes through WGS 50 wherein the CO level is reduced and is discharged into first vaporizer 52. First vaporizer 52 also receives a water stream 58 and is operable to transfer thermal energy from reformate stream 40 to water stream 58 which causes the vapor quality of water stream 58 to increase to a high level prior to exiting vaporizer 52 and flows with other vaporizer streams to combustor vaporizer 28, as described below. As used herein, vapor quality refers to the mass fraction that is vapor (i.e., steam). High vapor quality refers to the condition where the liquid water has been almost completely vaporized to its gaseous state. As presently preferred, a high level vapor quality is a level which will confidently remain within the two-phase state during transient operation of the system—e.g., in the range of about 0.7 to 0.95 for a given system.

Preferably, reformate stream 40 exits vaporizer 52 at a temperature of about 200-300° C. The temperature of reformate stream 40 is controlled by regulating the steam pressure within vaporizer 52 via a backpressure regulator (not shown) based on the temperature of the catalyst in reactor 54 in accordance with standard steam tables. Reformate stream 40 exits vaporizer 52 and enters low temperature WGS reactor 54 wherein the CO level of reformate stream 40 is further reduced. Reformate stream 40 is discharged from low temperature WGS reactor 54 into third stage reactor 34.

Third stage reactor receives reformate stream 40 and is operable to reduce the CO content of reformate stream to about 2 to 50 ppm, depending on the fuel cell stack used in fuel cell system 20. Third stage reactor 34 includes a second vaporizer 56 according to the principles of the present invention, a first PrOx reactor 64, a third vaporizer 66 according to the principles of the present invention, a second PrOx reactor 68 and a forth vaporizer 70 according to the principles of the present invention. First and second PrOx reactors 64, 68 are operable to reduce the CO content of reformate stream 40. Alternatively, third stage reactor 34 can use one or more pressure-swing absorption devices 71 in lieu of or in addition to PrOx reactors 64, 68, as shown in the dashed lines in FIG. 1. An air stream 72 is introduced into reformate stream 40 prior to reformate stream 40 entering vaporizer 56. Air stream 72 is added to provide a desired oxygen content to reformate stream 40 prior to undertaking a preferential oxidation reaction in first PrOx reactor 64. A water stream 74 flows through vaporizer 56. Vaporizer 56 is operable to transfer thermal energy from reformate stream 40 to water stream 74 so that the vapor quality of water stream 74 increases to a high level (i.e., in the range of about 0.7 to 0.95) prior to exiting vaporizer 56 and flows with other vaporizer streams to combustor vaporizer 28, as described below.

Preferably, vaporizer 56 is operated to cool the temperature of reformate stream 40 prior to entering first PrOx reactor 64 to a temperature in a range of about 100-200° C. The temperature of reformate stream 40 is controlled by regulating the steam pressure within vaporizer 56 via a backpressure regulator (not shown) based on the temperature of the catalyst in reactor 64 in accordance with the standard steam tables.

The cooled reformate stream 40 is discharged from vaporizer 56 into first PrOx reactor 64 wherein the CO level of reformate stream 40 is further reduced. Reformate stream 40 discharges from first PrOx reactor into third vaporizer 66. An air stream 76 is introduced into reformate stream 40 prior to reformate stream 40 entering vaporizer 66 to provide a desired oxygen content to reformate stream 40 prior to undertaking a partial oxidation reaction in second PrOx reactor 68. Vaporizer 66 receives a water stream 78 and is operable to transfer thermal energy from reformate stream 40 to water stream 78 so that the vapor quality of water stream 78 increases to a high level (i.e., in the range of about 0.7 to 0.95) prior to exiting vaporizer 66 and flows with other vaporizer streams to combustor vaporizer 28, as described below.

Preferably, vaporizer 66 is operated to cool the temperature of reformate stream 40 prior to entering second PrOx reactor 68 to a temperature in a range of about 100-200° C. The temperature of reformate stream 40 is controlled by regulating the steam pressure within vaporizer 66 via a backpressure regulator (not shown) based on the temperature of the catalyst in reactor 68 in accordance with standard steam tables.

The cooled reformate stream 40 is discharged into second PrOx reactor 68 wherein the CO level of reformate stream 40 is further reduced. Reformate stream 40 is discharged from second PrOx reactor 68 into fourth vaporizer 70. Vaporizer 70 receives a water stream 80 and is operable to transfer thermal energy from reformate stream 40 to water stream 80 so that the vapor quality of water stream 80 increases to a high level (i.e., in the range of about 0.7 to 0.95) prior to exiting vaporizer 70 and flows with other vaporizer streams to combustor vaporizer 28, as described below.

Preferably, vaporizer 70 is operated to cool the temperature of reformate stream 40 prior to entering fuel cell stack 24 to a temperature of about 90° C. The temperature of reformate stream 40 is controlled by regulating the steam pressure within vaporizer 70 via a backpressure regulator (not shown) based on the temperature of the MEA in fuel cell stack 24 in accordance with standard steam tables.

The cooled reformate stream 40 is discharged from third stage reactor 34 into fuel cell stack 24. Fuel cell stack 24 receives reformate stream 40 and is operable to convert reformate stream 40 in conjunction with an oxidant stream 82 into electrical energy, a hydrogen-containing anode effluent stream 84 and an oxygen-containing cathode effluent stream 86. An air stream 88 is introduced into anode effluent stream 84 which then flows into combustor 26. Combustor 26 is operable to thermally and/or catalytically combust anode effluent stream 84 to consume the hydrogen in anode effluent stream 84. Combustor 26 discharges anode effluent stream 84 into combustor vaporizer 28.

Combustor vaporizer 28 receives anode effluent stream 84 and also receives a high vapor quality water stream 90. Water stream 90 is a combination of water stream 58 discharged from first vaporizer 52, water stream 74 discharged from second vaporizer 56, water stream 78 from third vaporizer 66, and water stream 80 discharged from fourth vaporizer 70. Combustor vaporizer 28 is operable to recover as much thermal energy from fuel cell system 20 as possible without regard to the vapor quality of water stream 90. An air stream 92 is added to water stream 90 discharged from combustor vaporizer 28 to form steam/air stream 38 which is routed to heat exchanger 46. Thus, vaporizers 52, 56, 66, 70 are operable to extract thermal energy from reformate stream 40 and use that thermal energy to produce process steam (in the form of steam/air stream 38) which is used in first stage reactor 30 to produce reformate stream 40.

Referring now to FIGS. 2-7, a vaporizer, generally indicated at 100, according to the principles of the present invention is shown. One skilled in the art will recognize that vaporizer 100 is representative of a vaporizer that may be utilized in various locations within fuel cell system 20. As presently preferred, vaporizer 100 is within the third stage reactor 34 and most preferable to condition the reformate stream entering the preferential oxidation reactors 64, 68. However, vaporizer 100 could be employed elsewhere in fuel cell system 20 to condition the reformate stream entering the second reactor 32 or the fuel cell stack 24. For brevity, a vaporizer according to the principles of the present invention will hereinafter only be referred to as vaporizer 100, however, it should be understood that vaporizers 56, 66 as well as vaporizers 52, 70 may be constructed as vaporizer 100 discussed below.

Figure 3:
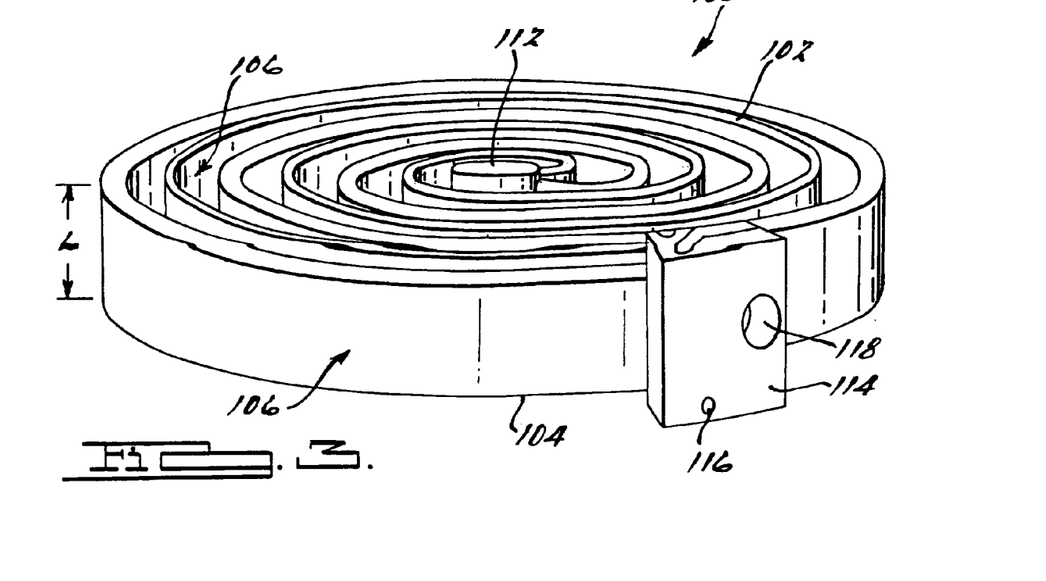
FIG. 3 is a perspective view of the vaporizer of FIG. 2 with the heat transfer fins removed.
Figure 5:
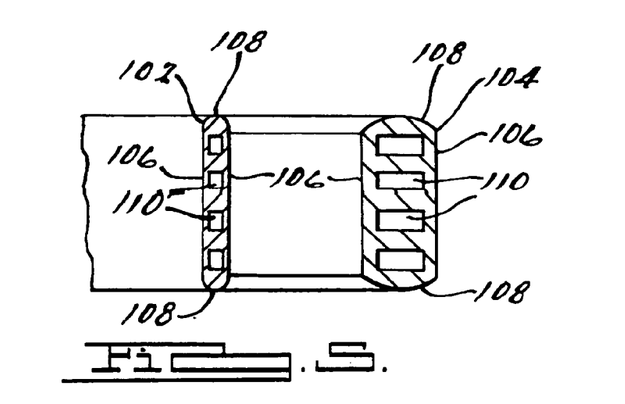
FIG. 5 is a cross-sectional view of the two different tubular portions of the vaporizer of FIG. 4 along line 5-5.

Vaporizer 100 includes a first tubular portion 102 that spirals inwardly from an outer section of vaporizer 100 to a central section of vaporizer 100 and a second tubular portion 104 that spirals outwardly from the central section of vaporizer 100 to the outer section of vaporizer 100. Second tubular portion 104 substantially follows the same path as first tubular portion 102 in spiraling outwardly from the central section to the outer section of vaporizer 100. Second tubular portion 104 is spaced apart from first tubular portion 102 as it spirals from the central section to the outer section of vaporizer 100. Tubular portions 102, 104, as best seen in FIGS. 3 and 5, are flattened tubular portions that each have substantially flat and opposite main heat transfer surfaces 106 that are separated by side walls 108. Each tubular portion 102, 104 also includes a plurality of passageways 110 that allow a fluid to flow through tubular portions 102, 104. Passageways 110 of first tubular portion 102 are in fluid communication with passageways 110 and second tubular portion 104. Specifically, a central manifold 112 located in the central section of vaporizer 100 interconnects passageways 110 in first and second tubular portions 102 and 104. Alternatively, first and second tubular portions 102, 104 can be directly connected together and avoid the necessity of using a central manifold 112.

Central manifold 112 is operable to interconnect tubular portions 102, 104 so that a fluid flowing through passageways 110 in first tubular portion 102 flows through central manifold 112 and into passageways 110 of second tubular portion 104. Central manifold 112 can be provided with an interior volume (not shown) that operates as a mixing chamber wherein a fluid flowing through central manifold 112 is mixed together so that a more homogeneous fluid exits central manifold 112 than enters central manifold 112. Additionally, tubular portions 102, 104 may be attached to central manifold 112 in different locations so that via gravity, second tubular portion 104 receives any liquid fluid within central manifold 112 prior to receiving any gaseous fluid, as dictated by a given application.

There is an outer manifold 114 to which one end of each tubular portion 102, 104 is attached. Outer manifold 114 has an inlet 116 that is interconnected to passageways 110 in first tubular portion 102 for providing a fluid to vaporizer 100. Outer manifold 114 has an outlet 118 that is interconnected to passageways 110 in second tubular portion 104 to allow fluid within passageways 110 in second tubular port 104 to exit vaporizer 100. As can be seen, inlet 116 is smaller than outlet 118 due to the increase in vapor quality of fluid flowing through passageways 110. That is, the fluid flowing into inlet 116 is expected to be a liquid or in a predominantly liquid state while the fluid flowing out of vaporizer 100 through outlet 118 will have a higher vapor quality such that the fluid is primarily in vapor form and the larger outlet facilitates maintaining the same mass flow into and out of vaporizer 100, as discussed below. Thus, fluid flowing through passageways 110 of vaporizer 100 enters passageways 110 at the outer section of vaporizer 100 and travels to the central section of vaporizer 100 in a spiraling manner through first tubular portion 102. The fluid then travels from the central section of vaporizer 100 to the outer section of vaporizer 100 in a spiraling manner through passageways 110 in second tubular portion 104.

As best seen in FIG. 5, the passageways 110 in first tubular portion 102 have an effective cross sectional area that is smaller than an effective cross-sectional area of passageways 110 in second tubular portion 104. The difference in the effective cross-sectional areas of passageways 110 in first and second tubular portion 102, 104 accounts for the change in vapor quality of a fluid flowing through vaporizer 110. That is, it is expected that the liquid flowing through passageways 110 will enter vaporizer 100 as a liquid or in a two-phase state that is predominantly liquid and, through the transfer of thermal energy from a fluid flowing on the outside of tubular portions 102, 104 to the fluid flowing in passageways 110 will increase the vapor quality of the fluid in passageways 110 such that the fluid exits vaporizer 110 in a two-phase state of predominantly gas or possibly in an entirely single-phase gaseous state. By having the differing effective cross-sectional areas between first tubular portion 102 and second tubular portion 104, the same mass flow rate into and out of vaporizer 100 can be achieved while avoiding a high velocity in passageways 110 of second tubular portion 104 that may cause a high pressure drop or the erosion of passageways 110. In other words, the differing effective cross-sectional areas accommodate higher volumetric flow rates as fluid vaporizes while keeping the fluid velocity below erosion design constraints. Thus, with the different effective cross-sectional areas of first and second tubular portions 102, 104 the effective cross sectional area of passageways 110 of first tubular portion 102 can be sized to provide a desired inlet velocity to provide an efficient heat transfer while the effective cross-sectional area of passageways 110 in second tubular portion 104 can be sized to maintain the mass flow rate while preventing a high pressure drop and/or erosion of passageways 110 due to a high velocity of the fluid flowing there through.

Figure 2:
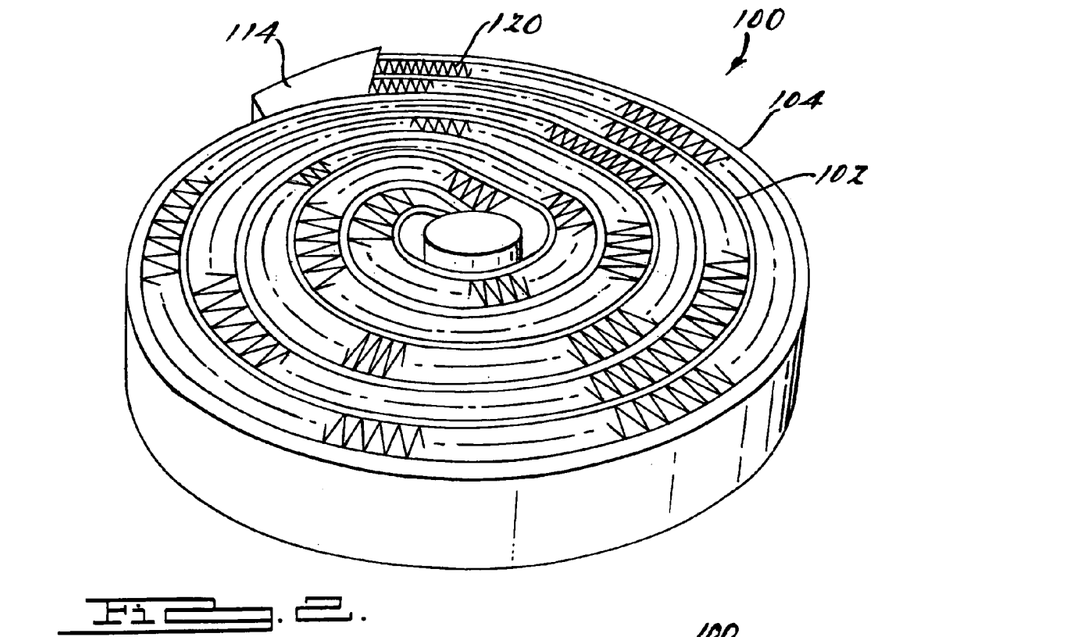
FIG. 2 is a perspective view of the preferred embodiment of a vaporizer according to the principles of the present invention.
Figure 6A:
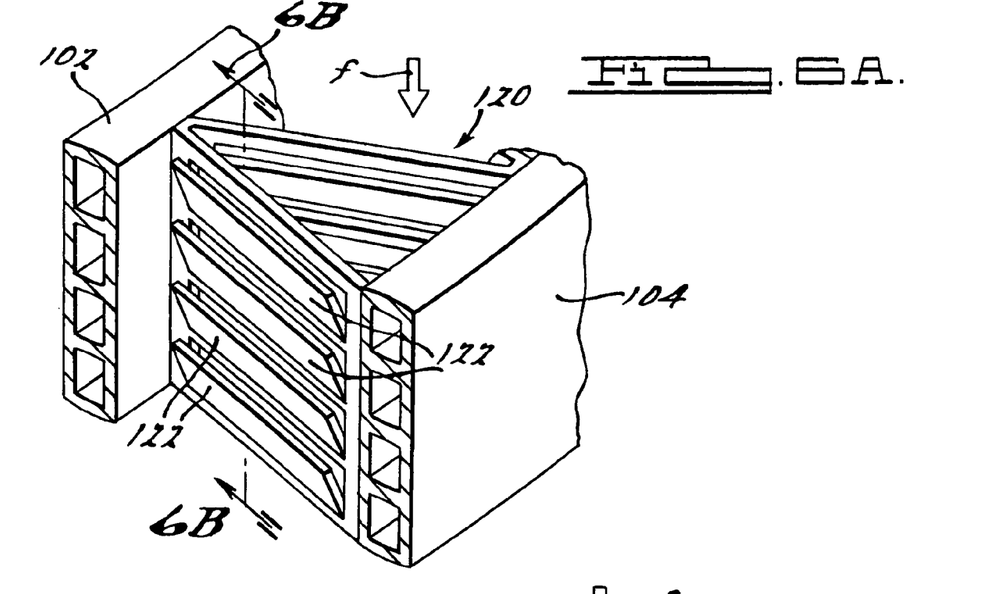
FIGS. 6A and 6B are detailed illustrations of a corrugated fin according to the principles of the present invention.
Figure 6B:
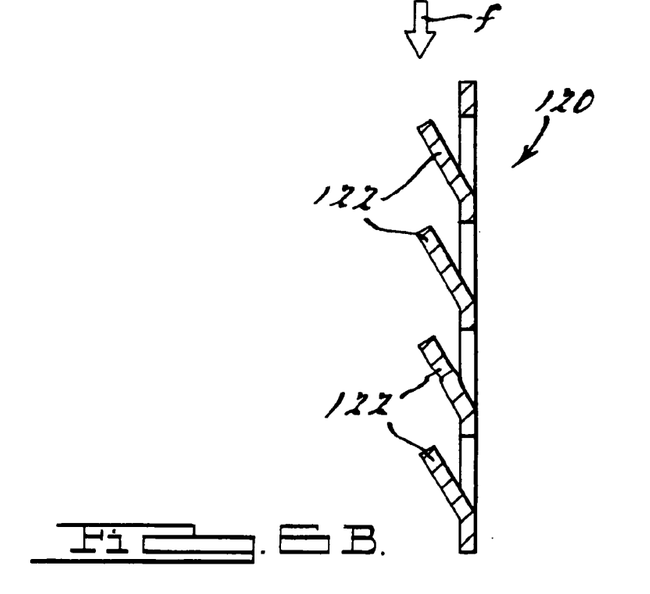
Figure 7:
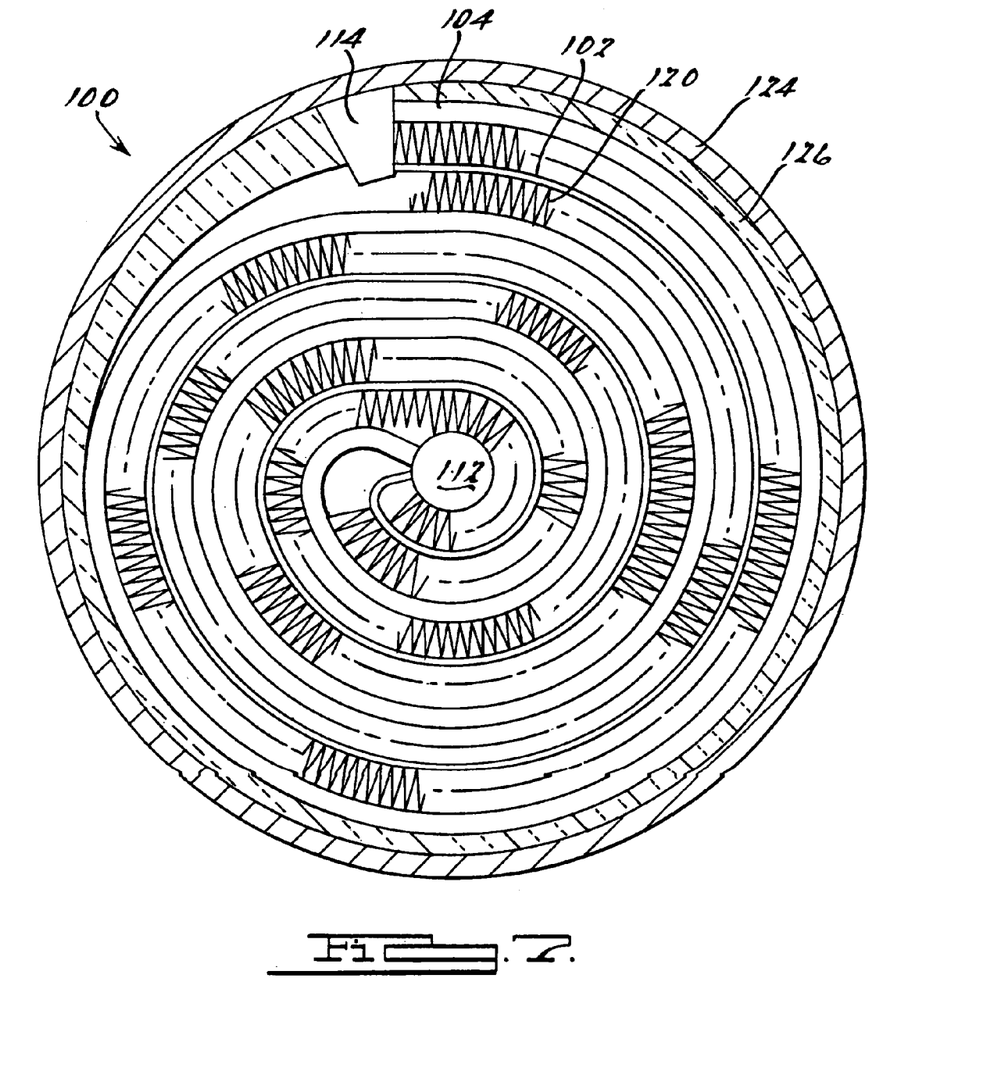
FIG. 7 is a side view of the vaporizer of FIG. 2 within a cylindrical housing according to the principles of the present invention.

Referring now to FIGS. 2 and 7, vaporizer 100 includes a plurality of corrugated heat transfer fins 120 that extend between opposing main heat transfer surfaces 106 of first and second tubular portions 102, 104. Fins 120 are brazed to one or both of opposing surfaces 106 on tubular portions 102, 104 so that more efficient heat transfer can be achieved. Alternatively, fins 120 can be attached to surface(s) 106 by other suitable means, such as by an adhesive. Fins 120 are preferably multi-louvered, as shown in FIGS. 6A and 6B, to increase turbulence in a flow across fins 120. That is, fins 120 each have a series of louvers 122 which are oriented slightly off from the direction of flow (indicated by the arrow f) to increase turbulence and hence the heat transfer coefficient and heat transfer effectiveness of vaporizer 100. As presently preferred, the louvers are angled upstream at about 20°-30° off from the direction of flow f. In this manner, the fins 120 are louvered similar to that found in conventional automotive radiators, heater cores and evaporators. The use of multi-louvered fins also provides an increased durability by providing enhanced ability to flex when vaporizer 100 is subject to thermal expansion forces. To improve the efficiency of vaporizer 100, tubular portions 102, 104 and fins 120 are preferably made from a material exhibiting high thermal conductivity, such as aluminum.

Figure 4:
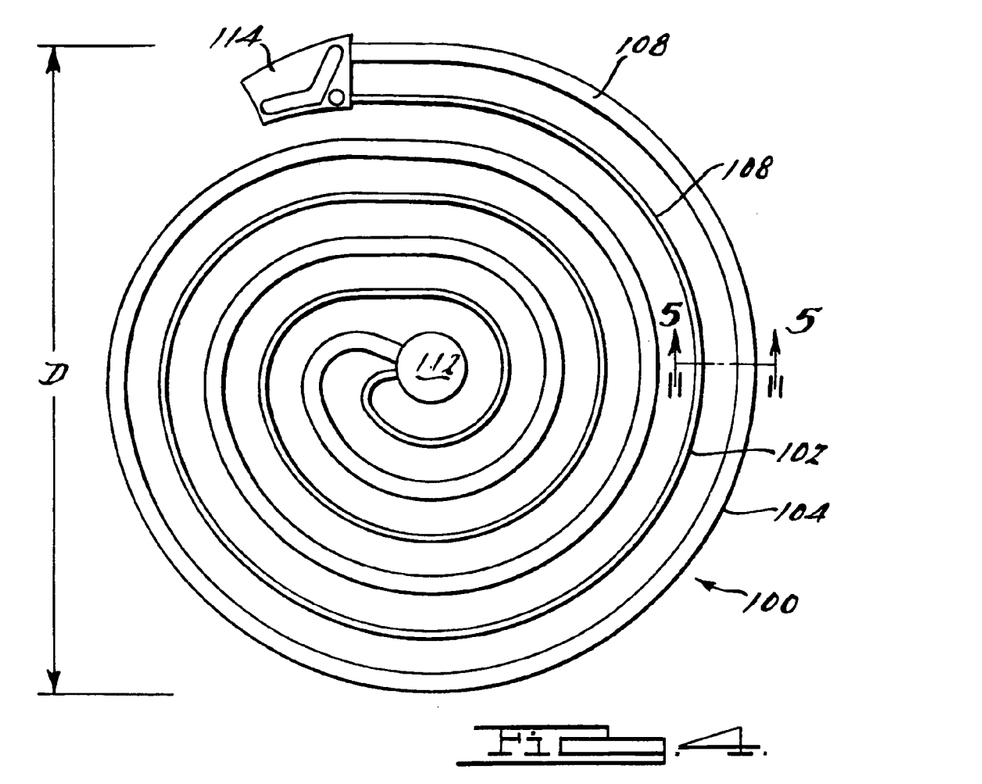
FIG. 4 is a plan view of the vaporizer of FIG. 3.

Vaporizer 100 is generally cylindrical in shape. Specifically, vaporizer 100, as shown in FIGS. 3 and 4, has a length l and a diameter d. Length l is generally parallel to the flow of a fluid flowing across the exterior of tubular portions 102, 104 while diameter d is substantially orthogonal to that flow. As can be seen, diameter d is substantially larger than length l. Preferably, diameter d is in the range of about 3 to 5.5 times length l. The difference between diameter d and length l in conjunction with the counter spiraling arrangements of tubular portions 102, 104 facilitates a more uniform thermal energy transfer such that a spatial temperature profile (across diameter d) of a fluid on the exterior of tubular portions 102, 104 is generally uniform.

Referring now to FIG. 7, tubular portions 102, 104 are located within an exterior outer shell 124 having a diameter D. Outer shell 124 is preferably a metallic outer shell. Insulation 126 is positioned between outer shell 124 and the outermost spiral layer of second tubular portion 104. Insulation 126 functions to limit thermal energy transfer between the interior of vaporizer 100 and the exterior environment. The diameter D of vaporizer 100 is preferably the same as the reactor with which the vaporizer is associated. For example, PrOx reactors 64, 68 are all generally cylindrical in shape and diameter D of vaporizer 100 is made to be substantially the same as that of the adjacent reactor. Even more preferably, outer shell 124 is part of an outer shell of one or more of the reactors that comprise fuel processing system 22. For example, the components of third stage reactor 34 can all be part of an integral reactor with a common outer shell that encloses vaporizers 56, 66 and PrOx reactors 64, 68. The matching of the diameters of the vaporizer to the adjacent reactor enhances the uniformity of the velocity of the reformate stream entering the vaporizer by avoiding pressure drops and irregular obstructions that would be encountered during a transition from one size one flow area for the reactor to a different flow area and a more even flow distribution is achieved.

A vaporizer constructed in accordance with the present invention provides a uniform spatial temperature profile in which hot spots at the inlet and outlet for both the water/steam stream and the reformate stream are eliminated. As such, the temperature at which the reformate stream is discharged can be consistently controlled during significant fluctuation in the heat generated by the system. Moreover, an efficient recovery of the heat is achieved by maintaining a high vapor quality of the water stream passing through the vaporizer.

In operation of vaporizer 100, reformate stream 40 flows parallel to the length 1 across the outer surfaces of tubular portions 102, 104 and fins 120. The water stream associated with the specific vaporizer flows into inlet 116 and through first tubular portion 102 in a spiral fashion to the central section of the vaporizer and then spirals outwardly through second tubular portion 104 from the central section of the vaporizer to the outer section of the vaporizer and exits outlet 118. This reverse spiraling configuration, hereinafter referred to as nested scroll design, provides for a compact design that produces efficient heat transfer between reformate stream 40 and the water stream flowing through the vaporizer.

The nested scroll design reduces the potential for a portion of reformate stream 40 exposed to the inlet water to be overcooled as the water reaches the two-phase temperature. Additionally, due to the nested scroll design, the spatial temperature profile (across diameter d) of reformate stream 40 flowing through the vaporizer is substantially uniform. Preferably, the vaporizer is operated so that the spatial temperature differential or difference in the reformate stream exiting the vaporizer is less than about 40° C. (i.e. +/−20° C.). More preferably, the vaporizer is operated so that the spatial temperature difference in the reformate stream exiting the vaporizer is less than about 20° C. (i.e., +/−10° C.). Most preferably, the vaporizer is operated to produce a spatial temperature difference in the reformate stream exiting the vaporizer of less than about 10° C. (i.e., +/−5° C.). Additionally, due to the spiraling nature, the diameter d of the vaporizer can be significantly greater, on the order of 5:1 or greater, than the length l of the vaporizer.

The improved spatial temperature uniformity of the reformate stream exiting the vaporizer optimizes the performance of any downstream reactor. That is, by providing a reformate stream that has a generally uniform temperature profile, the downstream reactor can be designed to accommodate a smaller spatial temperature differential of the reformate stream and, thus, lead to increased efficiency in the downstream reactor.

While the present invention has been described with reference to specific shapes, sizes, materials of construction, and operational parameters, it should be appreciated that these descriptions of the invention are merely exemplary in nature and, thus, variations that do not depart from the gist of the invention are intended to be within the scope of the invention. For example, tubular portions 102, 104 can be of shapes other than the flattened tubes that are preferred, such as round tubes or other geometries. Additionally, the fins on the tubes could be wires, such as spiral wound wires on the tubes, however, all of the advantages of the present invention may not be realized. Additionally, the size of the vaporizer can be adjusted to provide desired operational characteristics for a given application. For example, the vaporizer can have a diameter different than that of an upstream or downstream reactor without departing from the scope of the present invention. Furthermore, the effective cross-sectional areas of passageways 110 in first and second tubular portions 102, 104 can be the same size, although all the advantages of the present invention may not be realized. Thus, such variations are not to be regarded as a departure from the spirit and scope of the invention.

What is claimed is:

1. A vaporizer for a fuel processing system comprising:
a first tubular portion having a first passageway operable to exchange heat between a fluid in said first passageway and a fluid on an exterior of said first tubular portion, said first tubular portion extending radially inwardly from an outer section of the vaporizer to a central section of the vaporizer; and
a second tubular portion having a second passageway in fluid communication with said first passageway and operable to exchange heat between a fluid in said second passageway and a fluid on an exterior of said second tubular portion, said second tubular portion extending radially outwardly from said central section of the vaporizer to said outer section of the vaporizer substantially following a path of said first tubular portion while being spaced apart from said first tubular portion,
wherein each of said first and second tubular portions is a flat tubular portion having opposed major surfaces separated by minor side walls.

2. The vaporizer of claim 1, wherein said first tubular portion spirals inwardly from said outer section of the vaporizer to said central section of the vaporizer and said second tubular portion spirals outwardly from said central section of the vaporizer to said outer section of the vaporizer.

3. The vaporizer of claim 1, wherein each of said first and second tubular portions has a plurality of passageways.

4. The vaporizer of claim 1, wherein said first passageway has a first cross-sectional area and said second passageway has a second cross-sectional area which is larger than said first cross-sectional area.

5. The vaporizer of claim 1, wherein a fluid flows through said first passageway from said outer section to said central section and then flows through said second passageway from said central section to said outer section.

6. The vaporizer of claim 1, wherein fluid flowing through said first and second tubular portions vaporizes therein.

7. A vaporizer for a fuel processing system comprising:
a first tubular portion having a first passageway operable to exchange heat between a fluid in said first passageway and a fluid on an exterior of said first tubular portion, said first tubular portion extending radially inwardly from an outer section of the vaporizer to a central section of the vaporizer;

a second tubular portion having a second passageway in fluid communication with said first passageway and operable to exchange heat between a fluid in said second passageway and a fluid on an exterior of said second tubular portion, said second tubular portion extending radially outwardly from said central section of the vaporizer to said outer section of the vaporizer substantially following a path of said first tubular portion while being spaced apart from said first tubular portion; and a central manifold in said central section of the vaporizer, said central manifold connecting said first and second passageways together in fluid communication.

8. The vaporizer of claim 7, wherein said central manifold has an interior volume operable to mix a fluid entering said interior volume from said first passageway prior to said fluid flowing into said second passageway.

9. The vaporizer of claim 7, wherein fluid flowing through said first and second tubular portions vaporizes therein.

10. A vaporizer for a fuel processing system comprising:
a first tubular portion having a first passageway operable to exchange heat between a fluid in said first passageway and a fluid on an exterior of said first tubular portion, said first tubular portion extending radially inwardly from an outer section of the vaporizer to a central section of the vaporizer; and a second tubular portion having a second passageway in fluid communication with said first passageway and operable to exchange heat between a fluid in said second passageway and a fluid on an exterior of said second tubular portion, said second tubular portion extending radially outwardly from said central section of the vaporizer to said outer section of the vaporizer substantially following a path of said first tubular portion while being spaced apart from said first tubular portion, wherein a plurality of fins are disposed between said first and second tubular portions.

11. The vaporizer of claim 10, wherein said fins are multi-louvered fins.

12. The vaporizer of claim 10, wherein fluid flowing through said first and second tubular portions vaporizes therein.

13. A vaporizer for a fuel processing system comprising:
a first tubular portion having a first passageway operable to exchange heat between a fluid in said first passageway and a fluid on an exterior of said first tubular portion, said first tubular portion extending radially inwardly from an outer section of the vaporizer to a central section of the vaporizer; and a second tubular portion having a second passageway in fluid communication with said first passageway and operable to exchange heat between a fluid in said second passageway and a fluid on an exterior of said second tubular portion, said second tubular portion extending radially outwardly from said central section of the vaporizer to said outer section of the vaporizer substantially following a path of said first tubular portion while being spaced apart from said first tubular portion, wherein said first and second tubular portions form a generally cylindrical shape having a diameter substantially orthogonal to an exterior fluid flow and a length substantially parallel to said exterior fluid flow, said diameter being larger than said length.

14. The vaporizer of claim 13, wherein said diameter is at least three times greater than said length.

15. The vaporizer of claim 13, wherein fluid flowing through said first and second tubular portions vaporizes therein.

16. A fuel processing system operable to reform a fuel for a fuel cell, the system comprising:
a reactor having a reformate exhaust;
a vaporizer having:
a first element having a first passageway operable to exchange heat between a fluid in said first passageway and a fluid on an exterior of said first element, said first element extending from an outer section of said vaporizer to a central section of said vaporizer; and a second element having a second passageway in fluid communication with said first passageway, said second element being operable to exchange heat between a fluid in said second passageway and a fluid on an exterior of said second element, and said second element extending from said central section of said vaporizer to said outer section of said vaporizer substantially following a path of said first element while being spaced apart therefrom, wherein said reactor is within a substantially cylindrical outer shell having a first diameter, said vaporizer is within a substantially cylindrical outer shell having a second diameter, and said first and second diameters are substantially the same.

17. The system of claim 16, wherein said first element spirals inwardly from said outer section of said vaporizer to said central section of said vaporizer and said second element spirals outwardly from said central section of said vaporizer to said outer section of said vaporizer.

18. The system of claim 16, wherein said first and second elements are flat tubular portions each having opposed major surfaces separated by minor side walls.

19. The system of claim 16, wherein a plurality of fins are disposed between said first and second elements.

20. The system of claim 16, wherein said first passageway has a first cross-sectional area, said second passageway has a second cross-sectional area which is larger than said first cross-sectional area.

21. The system of claim 16, wherein a fluid flows through said first passageway from said outer section to said central section and then flows through said second portion passageway from said central section to said outer section.

22. The system of claim 16, further including:
an outer shell surrounding a portion of said vaporizer; and
at least one layer of insulation, said insulation being located between said outer shell and an outer periphery of said heat exchange portions.

23. The system of claim 16, wherein fluid flowing through said first and second elements vaporizes therein.

24. A fuel processing system operable to reform a fuel for a fuel cell, the system comprising:
a reactor having a reformate exhaust;
a vaporizer having:
a first element having a first passageway operable to exchange heat between a fluid in said first passageway and a fluid on an exterior of said first element, said first element extending from an outer section of said vaporizer to a central section of said vaporizer; and a second element having a second passageway in fluid communication with said first passageway, said second element being operable to exchange heat between a fluid in said second passageway and a fluid on an exterior of said second element, and said second element extending from said central section of said vaporizer to said outer section of said vaporizer substantially following a path of said first element while being spaced apart therefrom.

wherein said reactor is one of a plurality of reactors, said vaporizer is one of a plurality of vaporizers, and each of said plurality of vaporizers receives said reformate stream from a corresponding one of said plurality of reactors.

25. The system of claim 24, wherein fluid flowing through said first and second elements vaporizes therein.

26. A vaporizer comprising:
a housing defining a fluid flow path;
a first element disposed within said fluid flow path, said first element having a first inlet, a first outlet, and a first spiral passageway therebetween; and
a second element disposed within said fluid flow path, said second element having a second inlet, a second outlet, and a second spiral passageway therebetween;

wherein said first outlet is in fluid communication with said second inlet and said first and second spiral passageways are arranged within said housing in a generally parallel, spaced apart relationship.

wherein said first spiral passageway has a first cross-sectional area and said second spiral passageway has a second cross-sectional area greater than said first cross-sectional area.

27. The vaporizer of claim 26, wherein each of said first and second elements are tubular elements.

28. The vaporizer of claim 27, wherein each of said tubular elements has multiple spiral passageways.

29. The vaporizer of claim 26, further comprising a manifold interposed between said first outlet and said second inlet.

30. The vaporizer of claim 26, further comprising fins between said first and second elements.

31. The vaporizer of claim 26, wherein fluid flowing through said first and second elements vaporizes therein.

* * * * *